United States Patent
Buddhikot et al.

(10) Patent No.: US 7,231,521 B2
(45) Date of Patent: Jun. 12, 2007

(54) SCHEME FOR AUTHENTICATION AND DYNAMIC KEY EXCHANGE

(75) Inventors: Milind M Buddhikot, Cliffwood, NJ (US); Scott C Miller, Freehold, NJ (US); Luca Salgarelli, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 899 days.

(21) Appl. No.: 10/190,171

(22) Filed: Jul. 3, 2002

(65) Prior Publication Data

US 2003/0014646 A1    Jan. 16, 2003

Related U.S. Application Data

(60) Provisional application No. 60/303,262, filed on Jul. 5, 2001.

(51) Int. Cl.
*H04L 9/12* (2006.01)
*H04L 9/00* (2006.01)
(52) U.S. Cl. .................. 713/171; 455/411; 713/151
(58) Field of Classification Search ............... 713/151, 713/168, 171; 455/411
See application file for complete search history.

(56) References Cited

U.S. PATENT DOCUMENTS

| | | | | |
|---|---|---|---|---|
| 5,349,642 A | * | 9/1994 | Kingdon | 713/161 |
| 5,365,551 A | * | 11/1994 | Snodgrass et al. | 375/141 |
| 6,317,028 B1 | | 11/2001 | Valiulis | 340/10.4 |
| 6,345,043 B1 | | 2/2002 | Hsu | 370/324 |
| 6,680,923 B1 | | 1/2004 | Leon | 370/328 |
| 2002/0174335 A1 | * | 11/2002 | Zhang et al. | 713/168 |

OTHER PUBLICATIONS

Patent Application Publication, Pub. No. US2001/0048744 A1, Published Dec. 6, 2001, Title: Access Point Device and Authentication Method Thereof, App. No. 09/846,907, Filed May 1, 2001.

* cited by examiner

*Primary Examiner*—Kambiz Zand
*Assistant Examiner*—Matthew Heneghan

(57) ABSTRACT

A scheme for authentication, dynamic key generation and exchange provides means for authentication of mobile nodes (22) and generation of per session, per node, encryption keys for encrypting/decrypting communications between a mobile node (22) and an access point (24) in wireless local area networks (50). The scheme utilizes the same infrastructure and authentication information for both data link layers (layer 2) and network layers (layer 3). This scheme is particularly applicable to networks adhering to the IEEE 802 LAN family of standards.

21 Claims, 5 Drawing Sheets

SCHEME FOR AUTHENTICATION AND DYNAMIC KEY EXCHANGE

CROSS-REFERENCE TO RELATED APPLICATION

The present application claims priority to U.S. Provisional Application Ser. No. 60/303,262, filed Jul. 5, 2001, entitled "Scheme for Authentication and Dynamic Key Exchange in 802.11 Networks," the entirety of which is incorporated herein by reference.

FIELD OF THE INVENTION

The present invention relates to authentication and key exchange methods, and more specifically to authentication and key exchange methods in wireless LAN networks.

BACKGROUND

Wireless local area networks (LANs) provide Internet access in hard-to-wire places such as airports, malls, and theaters. Due to the physically open and uncontrolled nature of the communications medium, e.g., radio frequency electromagnetic radiation, security is a concern. One of the existing standards for wireless LANs is a standard approved by the Institute of Electrical and Electronic Engineers (IEEE), commonly referred to as IEEE 802.11. This standard provides specifications related to access security, e.g., authentication and encryption.

Networks conforming to the IEEE 802.11 standard, referred to as 802.11 networks, typically comprise mobile nodes (MNs), such as personal computers (PCs) or personal digital assistants (PDAs). These MNs gain access to the 802.11 network via an Access Point (AP). An AP provides communication between a MN in a wireless LAN and another MN in the same or another LAN. In accordance with the IEEE 802.11 standard, before a MN can access the network, (1) it must be authenticated to verify its access privileges, and (2) a security association in the form of a shared secret key must be established between the AP and the MN. The AP and the MN use this key to encrypt all data communications between the AP and the MN. However, there are several disadvantages associated with the current IEEE 802.11 authentication and encryption schemes. First, the current authentication protocol for 802.11 networks specifies a shared key authentication method, wherein the AP and the MN are previously (prior to attempted communications) provided with the same shared secret key, to realize the mechanism for the AP to grant authentication and association to a specific MN. This typically requires that the secret key be delivered to the MN via a secure channel or mechanism independent of the 802.11 network.

Another disadvantage is that the same shared key used for authentication is also used for encryption. This requires that each time a new MN is added or an existing MN leaves the trusted, shared relationship, the key must be changed and delivered reliably to each MN. This makes the authentication scheme cumbersome and unsuitable for public networks, which typically require per user, per session keys.

Along with authentication requirements at the initial connection between the MN and the AP (commonly referred to as the data link layer or layer-2), there are authentication requirements at higher levels, such as on the network layer (layer-3). It is not uncommon for a user to carry a mobile device across multiple LANs with different network addresses. In accordance with the IEEE 802.11 standard, this roaming ability also requires an authentication routine to be executed between the MN and each AP encountered. As currently contemplated, the aforementioned data link layer and network layer authentication schemes are separately employed and utilize different algorithms and authentication information. This dual process is inherently inefficient and slows the authentication process. An improved scheme for authentication and key exchange is desired.

SUMMARY OF THE INVENTION

A system for authentication, dynamic key generation and exchange provides means for authentication of mobile nodes and generation of per session, per node, security keys for encrypting/decrypting communications between a mobile node and an access point in wireless local area networks using the same infrastructure and authentication information for both the data link and network layers.

In one embodiment, a system for authenticating a mobile node and establishing a data link layer security association between the mobile node and a network includes a mobile node having a transmitter/receiver portion, a mobile node authenticator processor, and a mobile node key generator. The mobile node transmitter/receiver portion is configured to receive at least one signal indicative of at least one of a first random number and a second random number, and provide a signal indicative of a first authenticator. The mobile node authenticator processor is configured to generate the first authenticator as a function of the first random number. The mobile node key generator is configured to generate a security key as a function of the second random number. The network includes a network transmitter/receiver portion, a network authenticator processor, and a network key generator. The network transmitter/receiver portion is configured to receive a signal indicative of the first authenticator and provide at least one signal respectively indicative of at least one of the first random number and the second random number. The network authenticator processor is configured to generate a second authenticator as a function of the first random number and compare the first authenticator with the second authenticator. The network key generator is configured to generate the security key as a function of the second random number for a current session.

In another embodiment, a method for authenticating a mobile node and establishing a data link layer security association between the mobile node and a network includes generating a first random number and conveying a signal indicative of the first random number from the network to the mobile node. A first authenticator is generated as a function of the first random number, a mobile node network access identifier, and a predetermined security key; and a signal indicative of the first authenticator is conveyed from the mobile node to the network. A second authenticator is generated as a function of the first random number, the mobile node network access identifier, and the predetermined security key. The first authenticator is compared with the second authenticator. If the first authenticator matches the second authenticator, a second random number is generated and a security key is generated at the network, wherein the encryption key is generated as a function of the second random number, the network access identifier, and the predetermined security key. The encryption key is configured to encrypt and decrypt communications between the mobile node and the network for a current session. A signal indicative of the second random number is conveyed from the network to the mobile node and the security key is generated at the mobile node.

DETAILED DESCRIPTION

A scheme for authentication, dynamic key generation and exchange as described herein provides means for authentication of mobile nodes (MNs) and generation of per session, per node, encryption keys for encrypting/decrypting communications between a MN and an access point (AP) in wireless local area networks (LANs). The scheme is applicable to both data link layers (layer 2) and network layers (layer 3). This scheme is particularly applicable to networks adhering to the IEEE 802 LAN family of standards, referred to as 802 networks. To aid in understanding this scheme, a list of abbreviations and acronyms is provided in Table 1.

TABLE 1

| | |
|---|---|
| $k_{A-B}$ | Secret key shared between nodes A and B |
| AAA | Authentication, authorization, and accounting server |
| AP | Access Point |
| MN | Mobile Node |
| NAI | Network Access Identifier |
| $A_{A-B}$ | A security association between nodes A and B allowing secure exchange of information between nodes A and B. |

Figure 1:
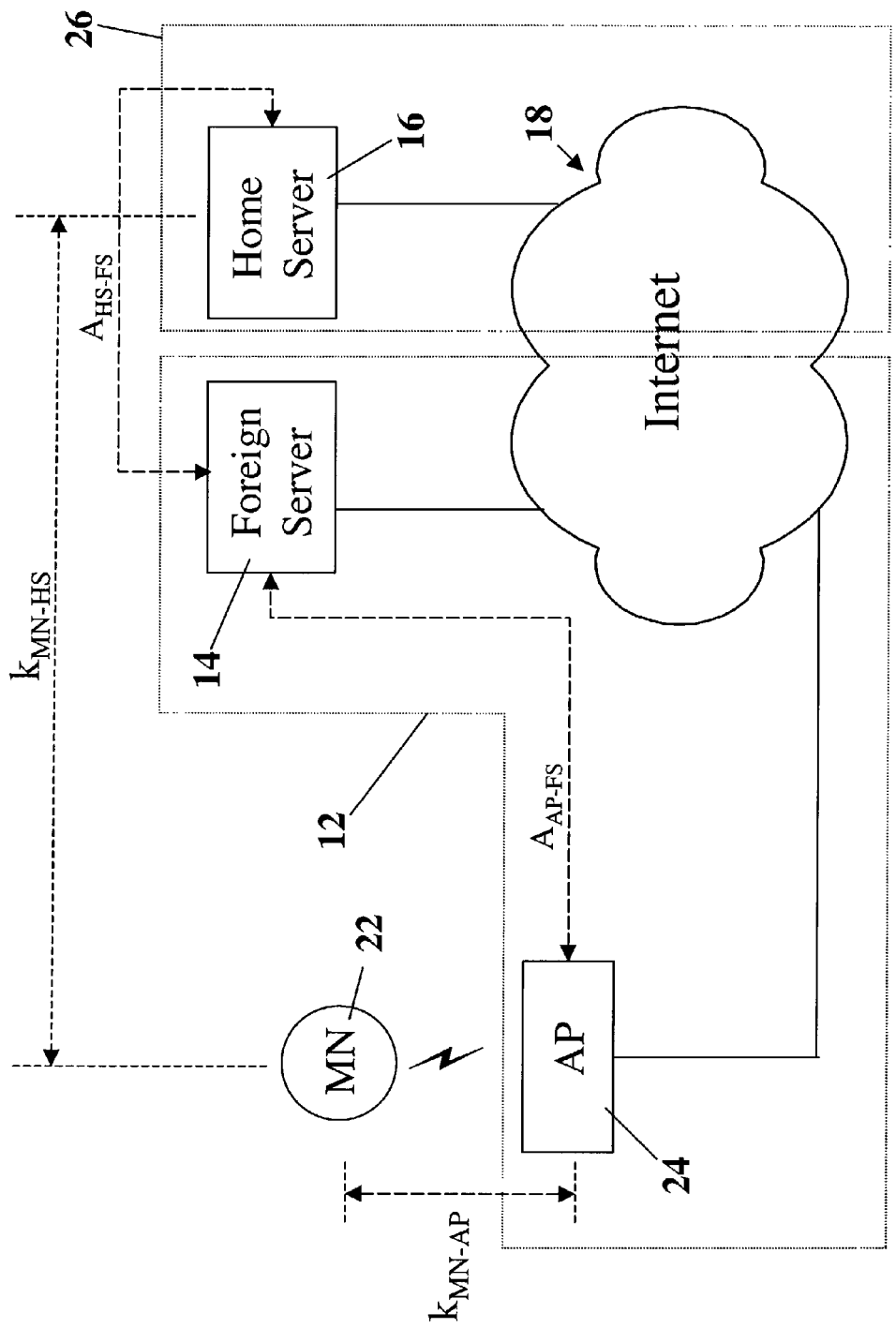
FIG. 1 is an illustration of a mobile node communicating with a foreign network via an access point.

FIG. 1 is an illustration of a system 100 including a mobile node (MN) 22 communicating with a foreign network 12 via an access point (AP) 24. Examples of mobile nodes include programmable digital assistants (PDAs), cellular phones, PALM devices, notebooks, e.g., laptops, personal computers (PCs), or a combination thereof. The MN 22 is associated with a home server 16. In one embodiment, the home server 16 is an authentication, authorization, and accounting (AAA) server. The home server 16, functioning as a home authentication, authorization, and accounting server (H-AAA), maintains security-related information pertaining to the MN 22. This security-related information may include information such as the MN's 22 network access identifier (NAI) and a security key, $k_{MN-HS}$, shared by the MN and the home server 16. The MN's 22 NAI allows the MN to access a network having the ability to verify the NAI. As an analogy, the MN's NAI may be compared to a user ID used to gain access to a network. For example, the MN 22 may attempt to access a home network 26 via home server 16. The MN 22 would first identify itself, and then provide its NAI. The home server 16, then acknowledges the NAI, and allows the MN 22 to attach to the home network 26, e.g., via an access point. The shared security key, $k_{MN-HS}$, shared between the MN 22 and the home server 16, is an encryption key used to encrypt communications between the MN 22 and the home server 16. This shared key, $k_{MN-HS}$, is maintained by the MN 22 and the home server 16 and is used to encode and decode information.

The foreign network 12 comprises the AP 24 and the foreign server 14. The AP 24 and the foreign server 14 are communicatively coupled via the Internet 18. This communicative coupling is exemplary. The AP 24 may be communicatively coupled to the foreign server 14 via any appropriate communicatively coupling technology, such as wireless, wireline, optical, electromagnetic, infrared, or a combination thereof. The foreign server 14 may function as an AAA server, also referred to as an F-AAA. Functioning as an F-AAA, foreign server 14 maintains security-related information pertaining to the AP 24. As shown in FIG. 1, security associations exist between the AP 24 and the foreign server 14 (as indicated by the dotted line labeled $A_{AP-FS}$), and between the home server 16 and the foreign server 14 (as indicated by the dotted line labeled $A_{HS-FS}$). Also, a predetermined security key, $k_{MN-HS}$, is shared between the MN 22 and the home server 16, as indicated by the dotted line labeled $k_{MN-HS}$.

The depiction of foreign network 12 and home network 26 in FIG. 1 as separate networks is exemplary. The home network 26 and the foreign network 12 may comprise common components, devices, processors, interfaces, or a combination thereof. In one exemplary embodiment, the foreign network 12 and the home network 26 are a single network.

In an exemplary scenario in accordance with the scheme for authentication, dynamic key generation and exchange in accordance with the present invention, the MN 22 is associated with the home server 16. As the MN node moves away from the home server 16, communication between the two may rely on a third party. This reliance may be a result of, for example, the MN 22 being physically moved, e.g., in a vehicle, away from the home server 16. Once the MN 22 is no longer in direct communications with the home server 16, the MN 22 tries to gain access to the home network 26 via a foreign network with which the MN 22 is currently able to communicate, e.g., foreign network 12. Before secure communications can begin between the foreign network 12, via the access point 24, the MN 22 must be authenticated and a security key (indicated as $k_{MN-AP}$ in FIG. 1) for encrypting/decrypting communications between the MN 22 and the AP 24 must be generated and provided to the MN 22 and the AP 24. However, because the communication path between the MN 22 and the AP 24 may be subject to being monitored, the security key, $k_{MN-AP}$, may not be directly transmitted between the AP 24 and the MN 22. As described in greater detail below, the scheme for authentication, key generation, and exchange includes the MN 22 communicating with the AP 24 via a non-secure communications path, the AP 24 communicating with the foreign server 14 via a secure communications path (security association $A_{AP-FS}$), and the foreign server 14 communicating with the home server 16 via a secure communications path (security association $A_{HS-FS}$).

Figure 2:
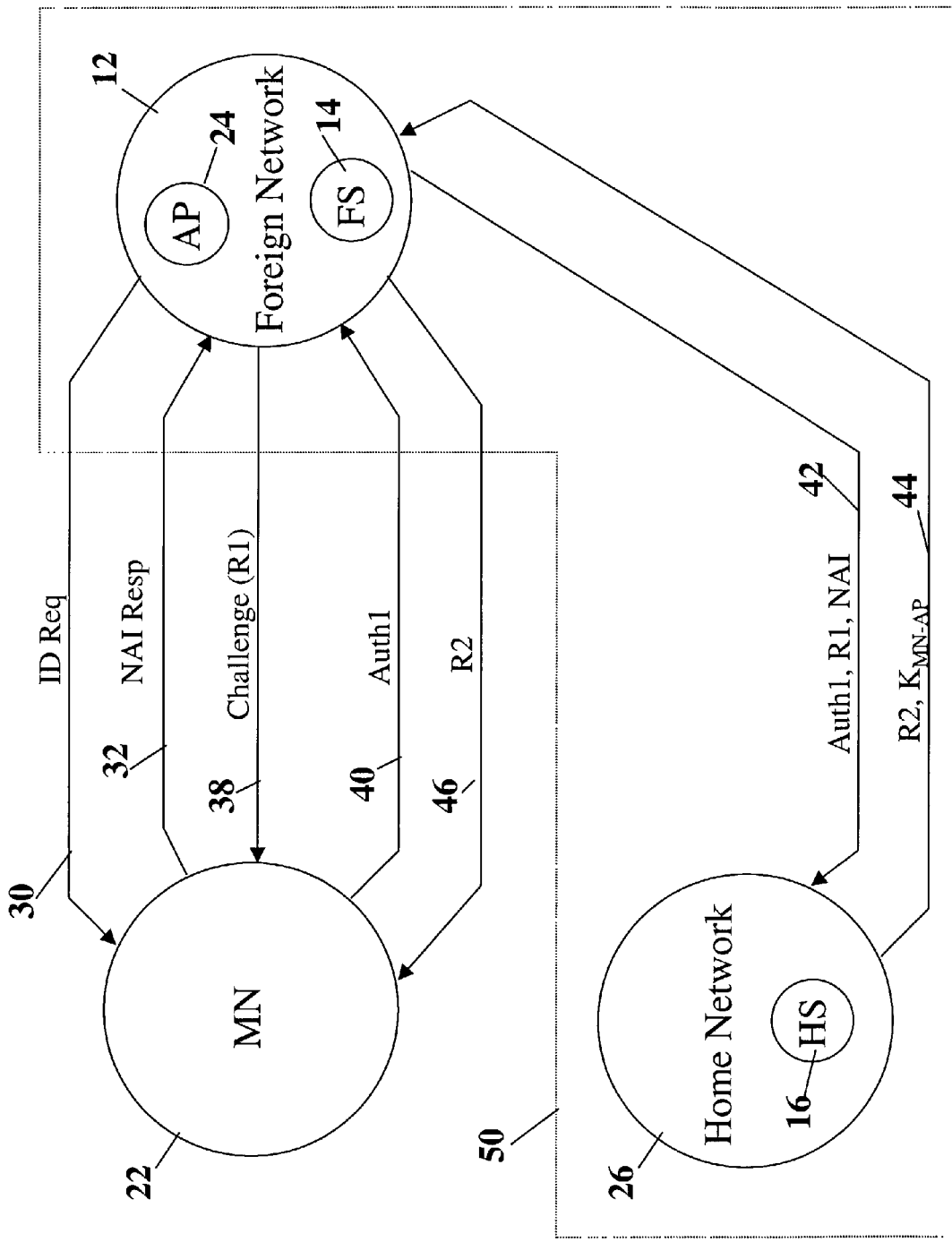
FIG. 2 a data flow diagram of a scheme for authentication, dynamic key generation and exchange between a mobile node and a network.

FIG. 2 is a data flow diagram of a scheme for authentication, dynamic key generation and exchange between a MN 22 and a network 50. Network 50 may be a single network or comprise a foreign network 12 and a home network 26. The following description is in terms of the foreign network 12 and the home network 26. Also, communication between the foreign network 12 and the home network 26 may be via any appropriate device. In an exemplary embodiment, communication between the foreign network 12 and the home network 26 is via the foreign server 14 and the home server 16.

In operation, as the MN 22 enters various regions, it tries to communicate with foreign networks in those regions. In order to communicate with a foreign network, e.g., via an AP, it must make itself known to the foreign network. This may be accomplished by the AP 24 listening for signals provided by the MN 22 or by the MN 22 listening for signals provided by the AP 24, or a combination thereof. After the MN 22 sends a start signal to the AP 24, the MN 22 attaches to the MN 22. The foreign network 12 provides a signal 30 to the MN 22 requesting the MN 22 for identification. The MN 22 responds by providing signal 32, which includes the MN's 22 network access identifier (NAI). The signal 32 is provided to the foreign network 12 via AP 24. The MN's 22 NAI is a network access identifier, which grants the MN 22 access to the home network 26.

The foreign network 12 acknowledges the received NAI and provides a signal 38 to the MN 22 comprising a challenge to the MN 22 to authenticate itself. The challenge is in the form of a randomly generated number (indicated as first random number, R1, in FIG. 2). The MN 22 generates a first authenticator as a function of this first random number (indicated as Auth1, in FIG. 2), the MN's 22 NAI, and the predetermined security key, $k_{MN-HS}$. This first authenticator is provided to the foreign network 12 via signal 40. The foreign network 12 then provides signal 42 to the home network 26. Signal 42 comprises the first authenticator, the first random number, and the MN's 22 NAI. The home network 26 then generates a second random number (indicated as R2 in FIG. 2).

Next, the home network 26 generates a security key ($k_{MN-AP}$) to be used to encrypt/decrypt communications between the MN 22 and the AP 24. This security key, $k_{MN-AP}$, is generated as a function of the first authenticator, the second random number, the MN's 22 NAI, and the predetermined security key, $k_{MN-HS}$, shared by the MN 22 and the home network 26. The home network 26 provides signal 44 to the foreign network 12. The signal 44 comprises the second random number and the security key, $k_{MN-AP}$. At this point, the foreign network has the security key, $k_{MN-AP}$, which can be used to encrypt communications to be provided to the MN 22 and decrypt communications received from MN 22. The foreign network 12, next provides signal 46, comprising the second random number, R2, to the MN 22. The MN 22 generates the same security key, $k_{MN-AP}$, using the generation process as used by the home network 26. The MN 22 generates the security key, $k_{MN-AP}$, as a function of the first authenticator, the second random number, its NAI, and the predetermined security key, $k_{MN-HS}$. Now, both the MN 22 and the foreign network 12 have the security, $k_{MN-AP}$, which can be used to encrypt and decrypt communications between the AP 24 and the MN 22. Both the foreign network 12 and the MN 22 have the same security key, $k_{MN-AP}$, which was not transmitted via a non-secure communications path, and specifically not transmitted between the MN 22 and the AP 24.

A new security key, $k_{MN-AP}$, is generated for each MN 22 and for each session. If a second MN enters the area to communicate with the foreign network 12, a new security key, $k_{MN-AP}$, is generated for that MN using the process described above. Also, each time the MN 22 starts a new communications session with the foreign network 12, a new security key, $k_{MN-AP}$, is generated. Thus, if security is breached for a particular session, e.g., security key, $k_{MN-AP}$, is obtained by an unauthorized entity, that security key, $k_{MN-AP}$, can not be used to breach the security of the next communication session.

Figure 3:
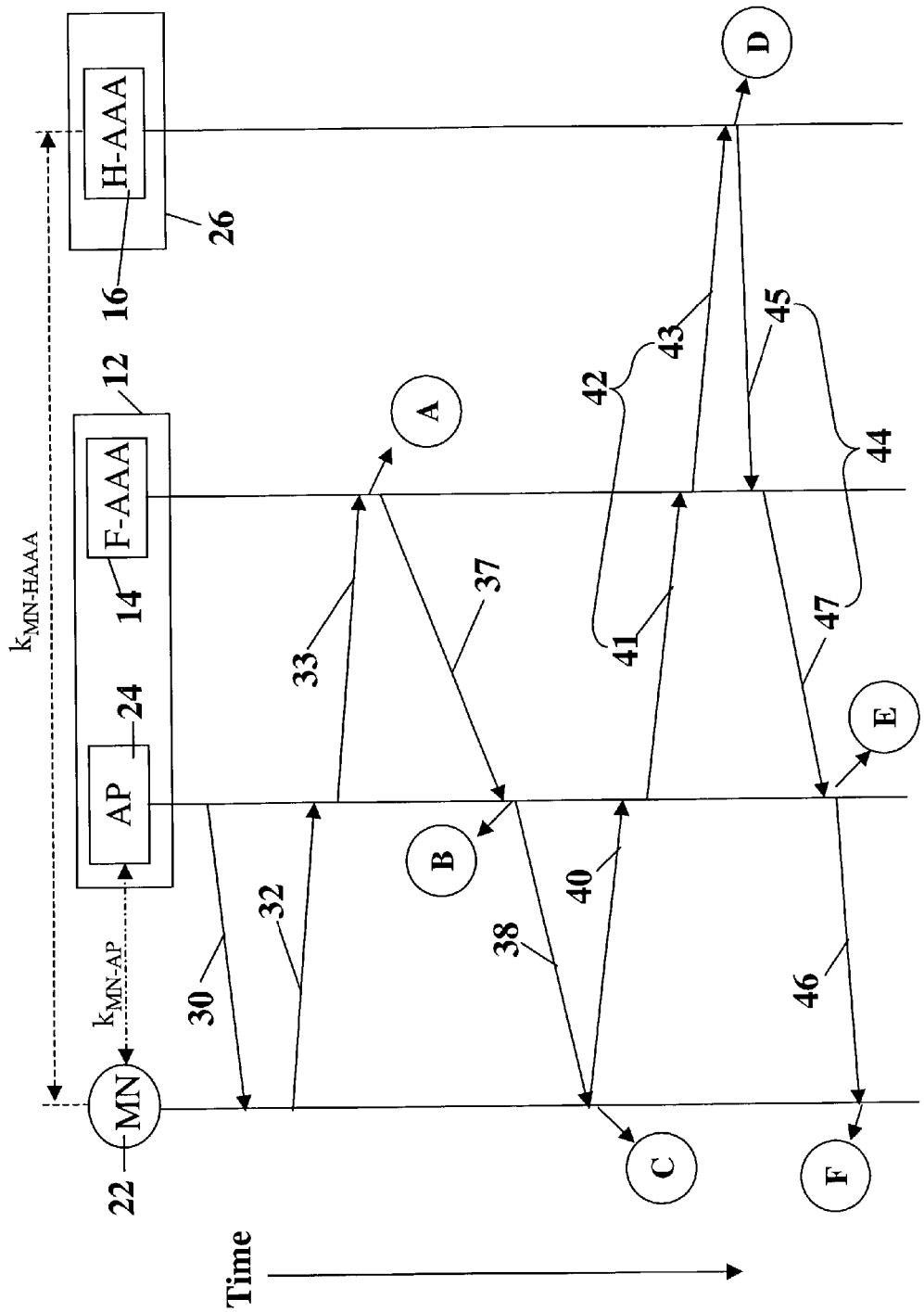
FIG. 3 is a timing diagram of a scheme for authentication, dynamic key generation and exchange for a mobile node, an access point, a home authentication, authorization, and accounting server, and a foreign authentication, authorization, and accounting server.

FIG. 3 is a timing diagram of a scheme for authentication, dynamic key generation and exchange for a MN 22, an AP 24, a F-AAA 14, and a H-AAA 16. As indicated in FIG. 3, foreign network 12 comprises AP 24 and foreign server 14 functioning as a F-AAA 14, and home network 26 comprises home server 16 functioning as a H-AAA 16. In one embodiment, networks 12 and 26 conform to the IEEE 802 LAN family of standards (802 networks). The shared key, $k_{MN-HAAA}$, is the predetermined security key shared between the MN 22 and the H-AAA 16. Prior to the MN 22 attempting to communicate with the AP 24, it is assumed that a pre-configured security association between the MN 22 and the H-AAA 16, utilizing the key, $k_{MN-HAAA}$, already exists. The key, $k_{MN-H-AAA}$, may be provided as a result of a service contract between a user, e.g., an owner of a MN, and a network provider, for example.

As indicated in FIG. 3, time is represented on the vertical axis. The AP 24 provides signal 30 to the MN 22. Signal 30 comprises a request for identification from the MN 22. The MN 22 responds to this request for identification by providing signal 32, which comprises the MN's 22 NAI. Next, the AP 24 provides signal 33 to the F-AAA 14. The FAAA 14 acknowledges receipt of the MN's 22 NAI at step A and provides signal 37 to the AP 24 in response to receiving signal 33.

Next, the AP 24 generates a first random number (indicated as R1 in FIG. 2) at step B. The first random number may be generated by any appropriate random number generator. Although the first random number may comprise any number of bits, it is advantageous if the first random number contains at least 128 bits, to ensure a proper level of security. The first random number is provided to the MN 22, as a challenge to the MN 22 to authenticate itself. The first random number is provided via signal 38. In response to receiving the signal 38, the MN 22 generates the first authenticator at step C. The first authenticator is generated as a function of the first random number received via the signal 38, the predetermined security key, $k_{MN-HAAA}$, shared by the MN 22 and by the home AAA server 16, and the MN's 22 NAI. The first authenticator may be generated using any appropriate algorithm. In one embodiment, the MD5 algorithm is used to generate the first authenticator. A first authenticator generated by the MD5 algorithm is compatible for use with 802 networks. The MD5 algorithm is well known in the art. The MD5 algorithm is a one-way hash algorithm typically used to create a message digest for digital signatures. The MD5 algorithm is applicable to compressing large messages into a secure format before a private key is used. The MD5 algorithm generates a 128-bit message digest from an input message of arbitrary length.

Upon generating the first authenticator, the MN 22 provides signal 40 to the AP 24 comprising the first authenticator. The AP 24 then provides the first authenticator, the MN's 22 NAI, and the first random number to the F-AAA 14 via signal 41. The F-AAA 14 in turn provides the first authenticator, the MN's 22 NAI, and the first random number to the H-AAA 16 via signal 43. Signals 41 and 43 are encompassed in signal 42 of FIG. 2.

Upon receiving the signal 43, the H-AAA 16 generates a second authenticator at step D. The second authenticator is generated using the same algorithm used to generate the first authenticator, e.g., MD5 algorithm. The second authenticator is generated as a function of the first random number, the predetermined security key, $k_{MN-HAAA}$, shared by the MN 22 and by the home AAA server 16, and the MN's 22 NAI. The first authenticator is compared to the second authenticator at step D. If the first and second authenticators match, a second random number is generated at step D. Although the second random number may comprise any number of bits, it is advantageous if the second random number contains at least 128 bits, to ensure a proper level of security. Next, the security key, $k_{MN-AP}$, is generated at step D. The security key, $k_{MN-AP}$, is generated as a function of the second random number, the MN's 22 NAI, and the predetermined security key, $k_{MN-HAAA}$. The security key, $k_{MN-AP}$, may be generated by any appropriate algorithm. In one embodiment, the security key, $k_{MN-AP}$, is generated using the MD5 algorithm.

The security key, $k_{MN-AP}$, and the second random number are provided to the F-AAA 14 via signal 45. The F-AAA 14 then provides the security key, $k_{MN-AP}$, and the second random number to the AP 24 via signal 47. Signals 45 and 47 are encompassed in signal 44 of FIG. 2. The security key, $k_{MN-AP}$, is extracted from the signal 47 at step E. This security key, $k_{MN-AP}$, is stored in the foreign network 12, such as in the AP 24, to be used to encrypt and decrypt communications between the AP 24 and the MN 22. However, at this point, the MN 22 does not have the security key, $k_{MN-AP}$. To maintain security, the security key, $k_{MN-AP}$ is not transmitted directly to the MN 22. Alternatively, the AP 24 then provides the second random number to the MN 22 via signal 46. The MN 22 generates the security key, $k_{MN-AP}$, at step F. The MN 22 generates the security key, $k_{MN-AP}$, using the same algorithm used to generate the security key, $k_{MN-AP}$, by the H-AAA 16 at step D, e.g., MD5 algorithm. The MN 22, at step F, generates the security key, $k_{MN-AP}$, as a function the second random number received via signal 46, the MN's 22 NAI, and the predetermined security key, $k_{MN-HAAA}$. At this point, both the AP 24 and the MN 22 have the same security key, $k_{MN-AP}$, which is used to encrypt and decrypt communication between the AP 24 and the MN 22. The process of generating a security key, $k_{MN-AP}$, as described above, is repeated each time the MN 22 starts a new session, or each time a new MN accesses the AP 24. Thus the security key, $k_{MN-AP}$, is generated on a per session, per node basis.

Figure 4:
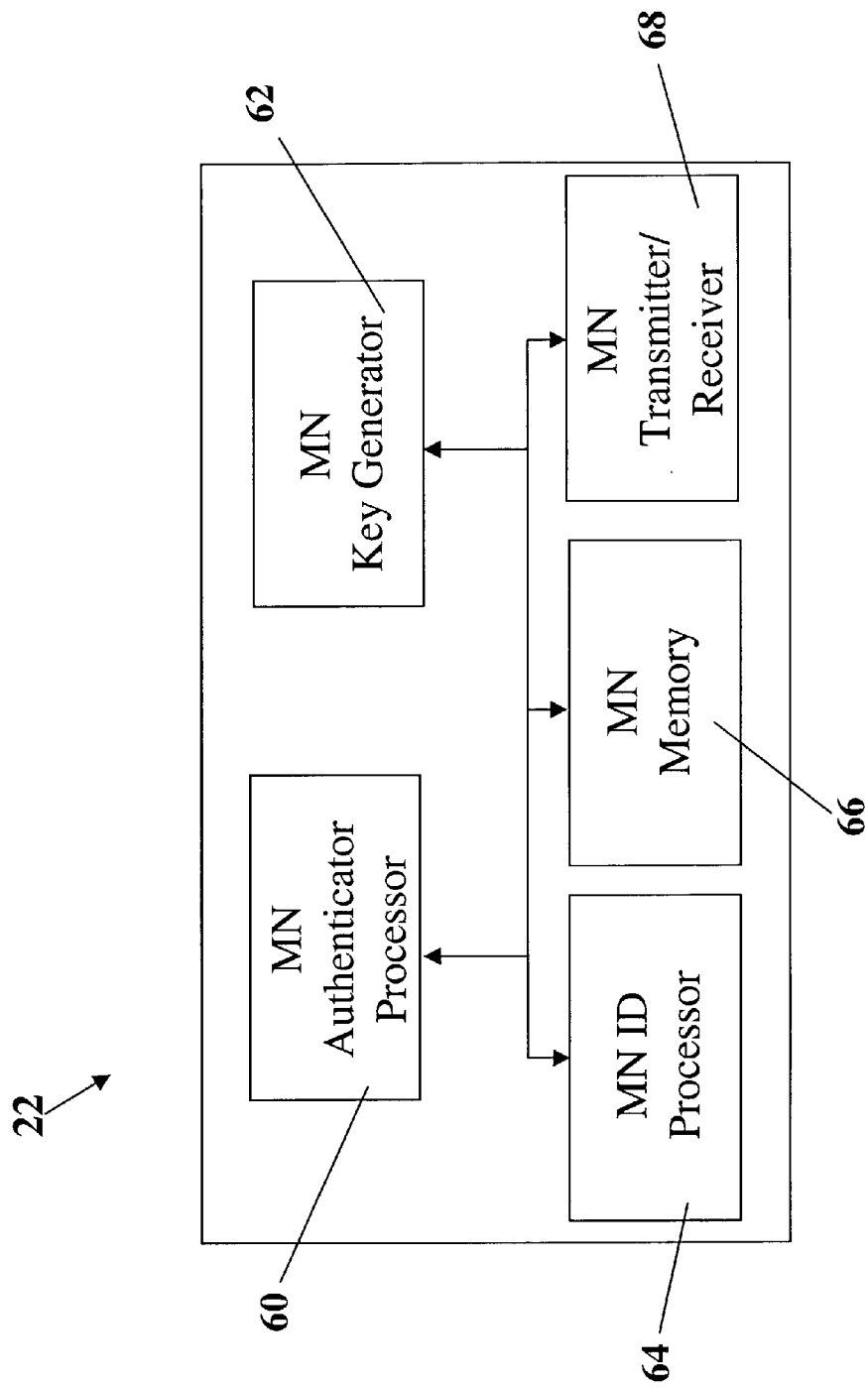
FIG. 4 is a functional block diagram of a mobile node in accordance with the present invention.

FIG. 4 is a functional block diagram illustrating portions of a MN 22 used in conjunction with a scheme for authentication and dynamic key exchange in accordance with the present invention. MN 22 comprises a MN authenticator processor 60, a MN key generator 62, a MN identification (ID) processor 64, a MN memory portion 66, and a MN transmitter/receiver 68. The MN authenticator processor 60 generates the first authenticator as a function of the first random number, the predetermined security key, $k_{MN-HAAA}$, and the MN's NAI. The MN key generator 62 generates the security, $k_{MN-AP}$, as a function of the second random number, the MN's NAI, and the predetermined security key, $k_{MN-HAAA}$. The MN ID processor 64 provides the MN's NAI is response to an ID request. In another embodiment, the MN ID processor 64 performs processing associated with gaining initial access to a network, such as polling a network for a response from an AP, listening for a signal, e.g., probe signal, from an AP and responding accordingly, or a combination thereof. The MN memory portion 66 stores and provides access to the MN's NAI and the predetermined security key, $k_{MN-HAAA}$. The MN transmitter/receiver 68 performs the functions associated with receiving and transmitting signals to and from the MN 22. The depiction of the various functional blocks as separate entities is exemplary. The various functions may be performed by separate, dedicated processors, by a distributed processor system, or a combination thereof. For example, the MN memory portion 66 may not exist as a separate memory, but may be distributed, such that memory is incorporated into each of the functional blocks.

Figure 5:
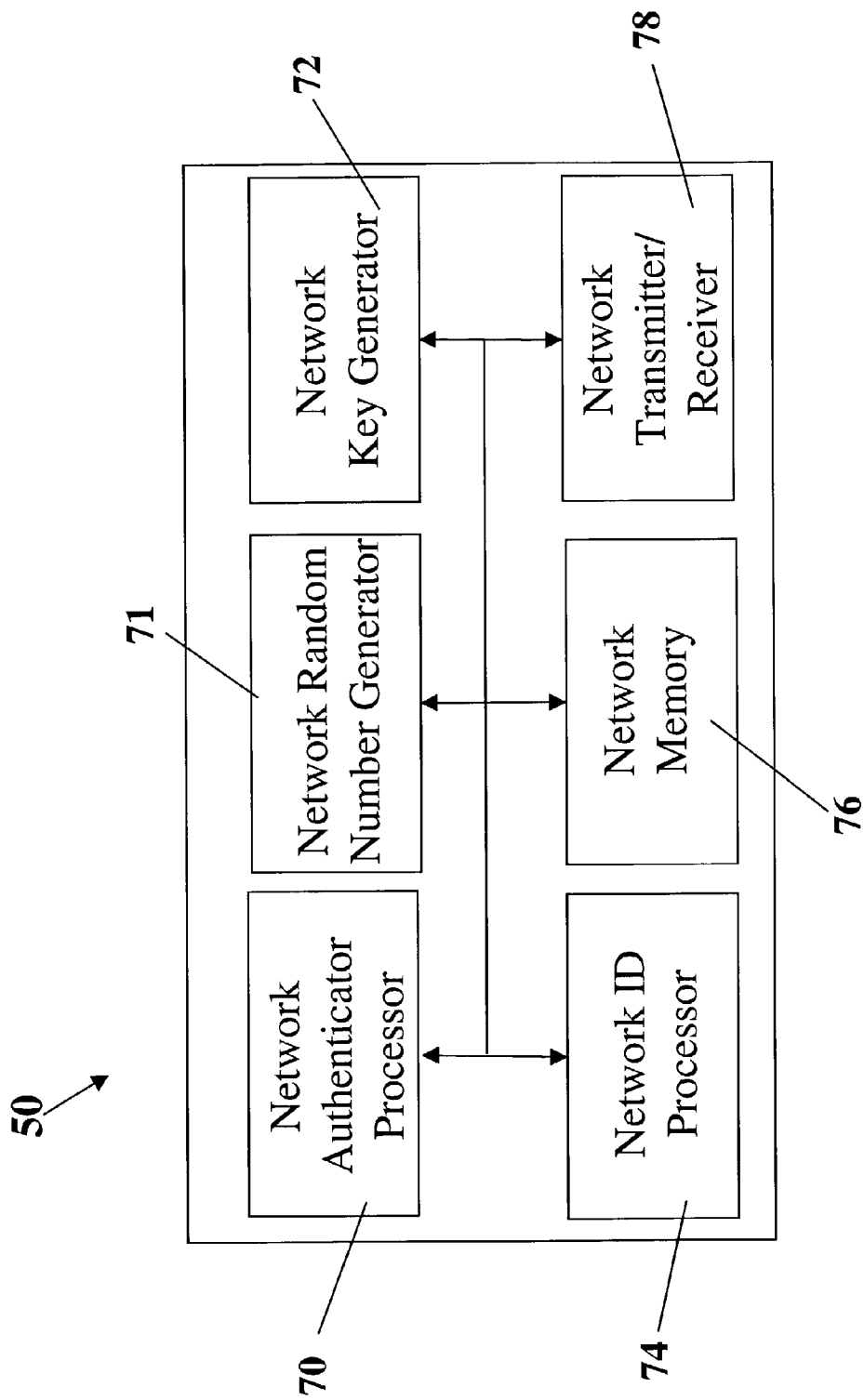
FIG. 5 is a functional block diagram of a network in accordance with the present invention.

FIG. 5 is a functional block diagram of a network 50 used in conjunction with a scheme for authentication and dynamic key exchange in accordance with the present invention. The network 50 may comprise a single network or a plurality of networks. In one embodiment the network 50 comprises a foreign network and a home network (See FIG. 2, for example). As shown in FIG. 5, the network 50 comprises a network authenticator processor 70, a network random number generator 71, a network key generator 72, a network identification (ID) processor 74, a network memory portion 76, and a network transmitter/receiver 78. The network authenticator processor 70 generates the second authenticator and compares the first authenticator with the second authenticator. The network random number generator 71, generates the first and second random numbers. The network key generator 72 generates the security, $k_{MN-AP}$, as a function of the second random number, the network NAI, and the predetermined security key, $k_{MN-HAAA}$. The network ID processor 74 performs processing associated with allowing the MN 22 to gain initial access to the network, such as polling a region to detect a MN, listening for a signal, e.g., probe signal, from a MN and responding accordingly, or a combination thereof. In one embodiment, the network ID processor 74 also performs the processing associated with acknowledging the MN's response of identification, e.g., MN's NAI. The network memory portion 76 stores and provides access to the MN's NAI and the predetermined security key, $k_{MN-HS}$. The network transmitter/receiver 78 performs the functions associated with receiving and transmitting signals to and from the network 50. The depiction of the various functional blocks as separate entities is exemplary. The various functions may be performed by separate, dedicated processors, by a distributed processor system, or a combination thereof. For example, the network 50 may comprise a foreign network 12 and a home network 26, wherein the network authenticator processor 70 is a function of the home network 26, the network random number generator 71 is a function distributed between both the home network 26 and the foreign network 12, the network key generator 72 is a function of the home network 26, the network ID processor 74 is a function distributed between both the home network 26 and the foreign network 12, the network memory portion 76 is a function distributed between both the home network 26 and the foreign network 12, and the network transmitter/receiver 78 is a function distributed between both the home network 26 and the foreign network 12.

Once the 802.11 layer-2 authentication and encryption is set up, protocols such as Mobile IP that use the same AAA infrastructure as above can transparently function. In other words, layer-2 and layer-3 authentication can be achieved using a 2-pass approach that (1) uses only one set of AAA databases, and (ii) allows re-use of the same authentication information (namely the NAI and $K_{MN-HAAA}$) to perform authentication and key distribution for both layer 2 and layer 3.

The scheme for authentication, dynamic key generation and exchange as described herein may be embodied in the form of computer-implemented processes and apparatus for practicing those processes. The scheme for authentication, dynamic key generation and exchange as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The scheme for authentication, dynamic key generation and exchange as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the scheme for authentication, dynamic key generation and exchange has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A method for generating a security key for a mobile node, said method comprising the steps of:
    receiving a signal indicative of a request for identification;
    providing a signal indicative of a network access identifier for said mobile node in response to said request for identification;
    generating an authenticator as a function of a first random number;
    generating said security key for said mobile node as a function of a second random number indicative of a validity of said authenticator, and
    using the network access identifier and a predetermined security key in the performance of authentication for both data link and network layers and using the same network address identifier and predetermined security key for both data link and network layers for key distribution.

2. A method in accordance with claim 1, further comprising the step of:
    receiving a signal indicative of said first random number;
    receiving a signal indicative of said second random number; and
    providing a signal indicative of said authenticator.

3. A method in accordance with claim 1, wherein said authenticator is generated further as a function of the network access identifier for said mobile mode and the predetermined security key.

4. A method in accordance with claim 3, said second random number being indicative of a match between said authenticator and a second authenticator, wherein:
    said second authenticator is a function of a provided version of said first random number, a provided version of said network access identifier, and said predetermined security key.

5. A method in accordance claim 1, wherein said security key is configured to encrypt and decrypt communications with said mobile node for a current session.

6. A method for generating a security key for an access point, said method comprising the steps of:
    providing a signal indicative of a request for identification;
    receiving a signal indicative of a network access identifier for a mobile node in response to said request for identification;
    generating a first random number;
    providing a signal indicative of said first random number;
    receiving a signal indicative of an authenticator being a function of said first random number;
    providing a signal indicative of said authenticator and said first random number;
    receiving a signal indicative of a second random number and said security key, wherein:
    said second random number is indicative of a validity of said authenticator; and
    said security key is a function of said second random number;
    providing a signal indicative of said second random number, and
    using the network access identifier and a predetermined security key in the performance of authentication for both data link and network layers and using the same network address identifier and predetermined security key for both data link and network layers for key distribution.

7. A method in accordance with claim 6, wherein said security key is an encryption key configured to encrypt and decrypt communications with said access point for a current session.

8. A method in accordance with claim 6, wherein said authenticator is a function of said first random number, the network access identifier, and the predetermined security key.

9. A method in accordance claim 6, said second random number being indicative of a match between said authenticator and a second authenticator, wherein:
    said second authenticator is a function of a provided version of said first random number, a provided version of said network access identifier, and said predetermined security key.

10. A method for generating a security key for a network, said method comprising the steps of:
    receiving a signal indicative of a first authenticator, a first random number, and a network access identifier;
    generating a second authenticator as a function of said first random number and said network access identifier as obtained from said signal, and a predetermined security key;
    comparing said first authenticator with said second authenticator; and
    if said first authenticator matches said second authenticator,
    generating a second random number;
    generating said security key as a function of said second random number, said network access identifier as obtained from said signal, and said predetermined key;
    providing a signal indicative of said second random number and said predetermined security key; and
    using the network access identifier and the predetermined security key in the performance of authentication for both data link and network layers and using the same network address identifier and predetermined security key for both data link and network layers for key distribution.

11. A method in accordance with claim 10, wherein said first authenticator is a function of said first random number, said network access identifier, and said predetermined security key.

12. A method for authenticating a mobile node and establishing a data link layer security association between said mobile node and a network, said method comprising the steps of:
- generating a first random number;
- conveying a signal indicative of said first random number from said network to said mobile node;
- generating a first authenticator as a function of said first random number, a mobile node network access identifier, and a predetermined security key;
- conveying a signal indicative of said first authenticator from said mobile node to said network;
- generating a second authenticator as a function of said first random number, said mobile node network access identifier, and said predetermined security key;
- comparing said first authenticator with said second authenticator;
- if said first authenticator matches said second authenticator,
- generating a second random number;
- generating a security key at said network, wherein:
- said security key is generated as a function of said second random number, said network access identifier, and said predetermined security key; and
- said security key is configured to encrypt and decrypt communications between said mobile node and said network for a current session;
- conveying a signal indicative of said second random number from said network to said mobile node; and
- generating a copy of said security key at said mobile node,
- wherein the same network access identifier and predetermined security key are used to perform authentication and key distribution for both data link and network layers.

13. A method in accordance with claim 12, further comprising the steps of:
- receiving, at said mobile node, a signal indicative of a request for identification; and
- conveying a signal indicative of said mobile node network access identifier from said mobile to said network in response to said request for identification.

14. A mobile node for generating a first security key, said mobile node comprising:
- a mobile node transmitter/receiver portion configured to:
- receive at least one signal indicative of at least one of a first random number and a second random number; and
- provide a signal indicative of a first authenticator;
- a mobile node authenticator processor configured to generate said first authenticator as a function of said first random number, a network access identifier for said mobile node, and a predetermined security key; and
- a mobile node key generator configured to generate said first security key as a function of said second random number, said network access identifier, and said predetermined security key,
- wherein the same network access identifier and predetermined security key are used to perform authentication and key distribution for both data link and network layers.

15. A network for generating a first security key, said network comprising:
- a network transmitter/receiver portion configured to:
- receive a signal indicative of a first authenticator being a function of a first random number, a network access identifier, and a predetermined security key, and
- provide at least one signal respectively indicative of at least one of said first random number and a second random number;
- a network authenticator processor configured to:
- generate a second authenticator as a function of said first random number, said network access identifier, and said predetermined security key; and
- compare said first authenticator with said second authenticator; and
- a network key generator configured to generate said first security key as a function of said second random number, said network access identifier, and said predetermined security key for a current session,
- wherein the same network access identifier and predetermined security key are used to perform authentication and key distribution for both data link and network layers.

16. A system for authenticating a mobile node and establishing a data link layer security association between said mobile node and a network, said system comprising:
- a mobile node comprising:
- a mobile node transmitter/receiver portion configured to:
- receive at least one signal indicative of at least one of a first random number and a second random number; and
- provide a signal indicative of a first authenticator;
- a mobile node authenticator processor configured to generate said first authenticator as a function of said first random number; and
- a mobile node key generator configured to generate a security key as a function of said second random number; and
- a network comprising:
- a network transmitter/receiver portion configured to:
- receive a signal indicative of said first authenticator, and
- provide at least one signal respectively indicative of at least one of said first random number and said second random number;
- a network authenticator processor configured to:
- generate a second authenticator as a function of said first random number; and
- compare said first authenticator with said second authenticator; and
- a network key generator configured to generate a copy of said security key as a function of said second random number for a current session,
- wherein the same network access identifier and predetermined security key are used to perform authentication and key distribution for both data link and network layers.

17. A system in accordance with claim 16, wherein:
said mobile node further comprises:
a mobile node memory portion configured to store:
a mobile node network access identifier, and
a predetermined security key;
a mobile node identification processor configured to provide said mobile node network access identifier in response to a request for identification; and
said network further comprises:
a network identification processor configured to: generate said request for identification; and
acknowledge a response to said request for identification;
a network random number generator configured to generate said first and second random numbers; and
a network memory portion configured to store:
a copy of said mobile node network access identifier, and
a copy of said predetermined security key.

18. A computer readable medium encoded with a computer program code for directing a processor to generate a security key for a mobile node, said program code comprising:
- a first code segment for causing said processor to receive a signal indicative of a first random number;
- a second code segment for causing said processor to generate an authenticator as a function of said first random number;
- a third code segment for causing said processor to provide a signal indicative of said authenticator;
- a fourth code segment for causing said processor to receive a signal indicative of a second random number indicative of a validity of said authenticator; and
- a fifth code segment for causing said processor to generate said security key for said mobile node as a function of said second random number,
- wherein the same network access identifier and predetermined security key are used to perform authentication and key distribution for both data link and network layers.

19. A computer readable medium encoded with a computer program code for directing a processor to generate a security key for a network, said program code comprising:
- a first code segment for causing said processor to generate a first random number;
- a second code segment for causing said processor to provide a signal indicative of said first random number;
- a third code segment for causing said processor to receive a signal indicative of an authenticator being a function of said first random number;
- a fourth code segment for causing said processor to provide a signal indicative of said authenticator and said first random number;
- a fifth code segment for causing said processor to receive a signal indicative of a second random number and said security key, wherein:
- said second random number is indicative of a validity of said authenticator; and
- said security key is a function of said second random number; and
- a sixth code segment for causing said processor to provide a signal indicative of said second random number,
- wherein the same network access identifier and predetermined security key are used to perform authentication and key distribution for both data link and network layers.

20. A computer readable medium encoded with a computer program code for directing a processor to generate a first security key for a network, said program code comprising:
- a first code segment for causing said processor to receive a signal indicative of a first authenticator, a first random number, and a network access identifier;
- a second code segment for causing said processor to generate a second authenticator as a function of said first random number and said network access identifier as obtained from said signal, and a predetermined security key;
- a third code segment for causing said processor to compare said authenticator with said second authenticator;
- a fourth code segment for causing said processor to generate a second random number, if said first authenticator matches said second authenticator;
- a fifth code segment for causing said processor to generate said first security key as a function of said second random number, said network access identifier as obtained from said signal, and said predetermined security key, if said first authenticator matches said second authenticator; and
- a sixth code segment for causing said processor to provide a signal indicative of said second random number and said predetermined security key if said first authenticator matches said second authenticator,
- wherein the same network access identifier and predetermined security key are used to perform authentication and key distribution for both data link and network layers.

21. A computer readable medium encoded with a computer program code for directing a processor to authenticate a mobile node and establish a data link layer security association between said mobile node and a network, said program code comprising:
- a first code segment for causing said processor to generate a first random number;
- a second code segment for causing said processor to convey a signal indicative of said first random number from said network to said mobile node;
- a third code segment for causing said processor to generate a first authenticator as a function of said first random number;
- a fourth code segment for causing said processor to convey a signal indicative of said first authenticator from said mobile node to said network;
- a fifth code segment for causing said processor to generate a second authenticator as a function of said first random number, a mobile node network access identifier, and a predetermined security key;
- a sixth code segment for causing said processor to compare said first authenticator with said second authenticator;
- a seventh code segment for causing said processor to generate a second random number if said first authenticator matches said second authenticator;
- an eighth code segment for causing said processor to generate an encryption key at said mobile node if said first authenticator matches said second authenticator, wherein:
- said encryption key is generated as a function of said second random number, said network access identifier, and said predetermined security key; and
- said encryption key is configured to encrypt and decrypt communications between said mobile node and said network for a current session;
- a ninth code segment for causing said processor to convey a signal indicative of said second random number from said network to said mobile node if said first authenticator matches said second authenticator; and
- a tenth code segment for causing said processor to generate said encryption key at said mobile node if said first authenticator matches said second authenticator,
- wherein the same network access identifier and predetermined security key are used to perform authentication and key distribution for both data link and network layers.

* * * * *